United States Patent
Monson et al.

(10) Patent No.: US 6,896,421 B2
(45) Date of Patent: May 24, 2005

(54) METHOD AND APPARATUS FOR ASSEMBLY OF AN OPTOELECTRONIC DEVICE WITH AN OPTICAL CONNECTOR

(75) Inventors: Robert J. Monson, St. Paul, MN (US); Richard L. Cellini, St. Michael, MN (US); Jianhua Yan, Prior Lake, MN (US); Thomas Derco, Savage, MN (US); Charles Kryzak, Mendota Heights, MN (US); Brian Leininger, Woodbury, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 10/375,570

(22) Filed: Feb. 26, 2003

(65) Prior Publication Data

US 2004/0165836 A1 Aug. 26, 2004

(51) Int. Cl.[7] .............................. G02B 6/43; G02B 6/42; G02B 6/00
(52) U.S. Cl. ............................ 385/89; 385/91; 385/136; 385/137
(58) Field of Search .............................. 385/88–94, 136, 385/137

(56) References Cited

U.S. PATENT DOCUMENTS

| | | | |
|---|---|---|---|
| 4,548,466 A | * | 10/1985 | Evans et al. .................. 385/90 |
| 5,042,890 A | | 8/1991 | Wehrle et al. |
| 5,337,392 A | | 8/1994 | Mousseaux et al. |
| 5,343,548 A | * | 8/1994 | Hall et al. ..................... 385/89 |
| 5,859,947 A | | 1/1999 | Kiryuscheva et al. |
| 6,190,056 B1 | | 2/2001 | Kwon et al. |
| 6,242,274 B1 | | 6/2001 | Nyholm |
| 6,439,780 B1 | | 8/2002 | Mudd et al. |
| 6,454,468 B1 | | 9/2002 | Yoon et al. |
| 6,457,873 B1 | | 10/2002 | Heier et al. |
| 6,471,419 B1 | * | 10/2002 | Hall et al. ..................... 385/91 |
| 6,498,892 B1 | | 12/2002 | Harman |
| 6,511,236 B1 | | 1/2003 | Webjorn et al. |
| 6,516,130 B1 | | 2/2003 | Jang |
| 6,565,266 B2 | | 5/2003 | Mun et al. |
| 6,571,041 B2 | | 5/2003 | Bourcier et al. |
| 6,767,141 B1 | * | 7/2004 | Dudek et al. ................. 385/92 |
| 2002/0168168 A1 | | 11/2002 | Iravani |
| 2004/0156594 A1 | * | 8/2004 | Monson et al. ............... 385/88 |

FOREIGN PATENT DOCUMENTS

GB    2131971 A    6/1984

* cited by examiner

Primary Examiner—Akm Enayet Ullah
Assistant Examiner—Omar Rojas
(74) Attorney, Agent, or Firm—Patterson, Thuente, Skaar & Christensen, PA

(57) ABSTRACT

A method of positioning an optoelectronic device, for example a vertical cavity surface emitting laser, onto an optical fiber connector and maintaining that exact alignment while testing the quality of the optical output prior to applying an adhesive to make the interface permanent. The method includes the utilization of a multi-piece fixture which clamps the elements into position, allows for testing, and provides a fixture to maintain position throughout the curing process.

30 Claims, 6 Drawing Sheets

METHOD AND APPARATUS FOR ASSEMBLY OF AN OPTOELECTRONIC DEVICE WITH AN OPTICAL CONNECTOR

FIELD OF THE INVENTION

The present invention relates to a method for assembling an optical device package and more particularly to coupling a plurality of optical fibers to an array of optoelectronic devices and testing the alignment of the coupling while maintaining relative position of the components prior to installation in the package. The invention further relates to an assembly tool for the above described method utilizing a multi-clamp fixture which aligns the optoelectronic device to the connector for the plurality of optical fibers, activates the optoelectronic device to allow for testing, and maintains position of the components for bonding prior to installation in the package.

BACKGROUND OF THE INVENTION

There is a need for high-speed cost effective optical transmitters which can operate as parallel optical communication data links. Prior analog communication systems have evolved to digital systems to satisfy the demand for the transfer of greater volumes of information. To meet this demand, advances have been made in transmission and in signal production of optical signals.

The preferred method of transmission for telecommunications is now optical fiber due to the increased bandwidth capacity and lower signal attenuation as compared to traditional copper networks. Optical fibers are thin filaments of drawn or extruded glass or plastic having a central core and surrounding coating that promotes internal reflection. A typical single mode fiber has a core diameter of only 10 microns while a multi mode fiber has a core diameter of 50 microns. The optical fibers are disposed within a connector, such as a commercially available MT optical connector, which is attached at one end to a waveguide with the optical fibers in alignment with the core region.

The preferred method for signal production for digital optical communications is by laser, and in particular semiconductor lasers. For example, vertical cavity surface emitting lasers (VCSELs) emit a coherent, collimated unidirectional light beam normal to the surface in which they are formed. The nature of VCSELs (and semiconductor lasers in general) is that the optical and electrical characteristics between each device vary slightly. The back or bottom surface of the VCSEL is usually attached to a mounting substrate and the output is emitted from the top or front face. Typically, an array of VCSELs are aligned so that each individual laser is positioned proximate to an input port which runs along a horizontal line in the front face of the optical connector.

In order to achieve high-speed cost effective optical transmissions, there is a need to efficiently couple a light source to an optical fiber. In aligning an array of VCSELs with their corresponding optical fibers it is desirable to ensure that each of the fiber ends is in precise alignment with corresponding lasers so that the optical signals are received with minimal distortion and/or attenuation. Alignment of the optical device to the waveguide within the optical connector usually requires manual or active positioning. Typically, alignment involves sub-micro meter accuracy, performed manually by skilled technicians using microscopes and high precision manipulators.

To simplify the alignment process, assembly frequently involves a passive guide approach. U.S. Pat. Nos. 5,179,609, 5,913,002, 5,574,814, 5,963,691, 6,130,979 describe various passive alignment systems for transferring optical signals from the light emitting device to the optical fiber. For example, U.S. Pat. No. 6,130,979 describes the use of alignment pins which are inserted within matching recesses for positioning the fiber optic cables relative to a laser array.

These passive alignment techniques are typically employed manually by the skilled technician just prior to the application of an adhesive to secure the fiber optic cables to the laser array. Unfortunately, the existing techniques employed in connection with passive alignment systems emphasize the importance of achieving alignment over all other operational requirements. If the alignment was successful as determined by a post-adhesive test of the connection, then the component has been successful built and the technique achieved its purpose. If, however, the alignment was off, either due to manufacturing tolerances or assembly variations, and the component fails a post-adhesive test of the connection, then the entire component must be scrapped. In addition, because of the differences in cure time for various adhesives, the passive alignment systems must remain in place for the entire duration of the relevant cure time.

While existing passive alignment techniques for aligning an array of VCSELs to their corresponding optical fibers have decreased the rejection rate associated with assembly of these components, it would be desirable to improve other aspects of the assembly process without sacrificing the gains realized by incorporating passive alignment techniques in the assembly process.

SUMMARY OF THE INVENTION

The present invention is a method of assembling a device package in which the critical alignment of optoelectronic device and optical fibers is tested prior to application of adhesives by mounting the optoelectronic device and optical fibers in a test fixture. An external activation system signals the optoelectronic device to fire optical signals through the interface of the optical fiber connector. Signal output is measured for distortion and attenuation. Properly aligned systems are then fixed by applying adhesive. The completed unit is then installed within the device package.

The test fixture of the present invention is an external alignment system tool for coupling an optoelectronic device to an optical fiber connector. The tool contains activation means for testing the alignment of the coupled optoelectronic device and optical fiber prior to installation into a device package. The tool is comprised of interconnected multiple clamps. An optical fiber connector clamp, which positions the optical fiber and optical fiber connector serves as a base element for the optoelectronic device clamp and the test clamp. The optoelectronic device clamp positions the optoelectronic device on to the previously positioned optical fiber connector. The test clamp positions and activates the laser array for the optoelectronic device by mating with the testing portion of the optical fiber connector clamp. The test elements of the clamp system may be removed during a curing stage of assembly if the optical output signifies proper alignment has been achieved.

Therefore, there is a need in the art for a cost efficient method of aligning and assembling a laser source to an optical connector. It is essential that the light source or laser diode portion and the light-receiving portion be exactly aligned with minimal distortion and attenuation of the optical signal. Variations in manufacture sometimes require numerous attempts at "matching" components before alignment is properly achieved. The method should therefore provide means to ensure accurate alignment before applying an adhesive to bind the components and maintain proper alignment during the curing. Preferably, cost efficiencies are realized by reducing the time intensive manual component of assembly and increasing the output of properly aligned assemblies.

In a preferred embodiment, the optoelectronic device will consist of a VCSEL array to which a flexible circuit is attached. In addition to passive alignment, the preferred tool utilizes a three clamp system for the assembly process. First, a VCSEL base clamp and a test base clamp are used to immobilize the optical MT connector within an appropriately sized cavity. The operating face of the MT connector, which mates with the output face of the optoelectronic device, is disposed approximately flush with top face of the clamp bases once fully engaged.

Next, the VCSEL is mated to the MT connector through the advancement of a pair of floating alignment pins inserted through the respective alignment holes within the VCSEL and MT connector. To ensure an accurate alignment, a VCSEL top clamp is advanced upon the VCSEL base clamp thus securing the optical device to the optical connector with a predetermined interface pressure provided by springs within the assembly.

Testing is performed on the aligned system by activating the VCSEL array through the flexible circuit. The test clamp, constructed of dielectric material, is advanced onto the distal end of the flexible circuit. Advancement of the test clamp places the activation pad array of the flexible circuit in contact with the pogo pins disposed in the test clamp. The individual lasers of the VCSEL array are activated and the output is transmitted through the MT optical connector to a test unit which measures signal strength and clarity. If the signal matches the predetermined operating parameters, the testing clamp and VCSEL clamp are removed and adhesive is applied to the interface of the MT optical connector and the VCSEL. The clamps are reinstalled and a final test performed. After a satisfactory output is achieved the test clamp portion of the tool is removed and is used on another unit while the VCSEL clamp remains to allow curing of the secured VCSEL and MT interface.

A further advantage of the present invention is the modular construction of the alignment tool. The tool is essentially comprised of four interrelated clamping elements so that when all units are engaged during the testing or sensing stage the tool takes the form of a rectangular solid. If alignment is correct, the testing half of the block can be removed and used on the next system while the VCSEL clamp half maintains alignment while the adhesive cures in an oven or by anaerobic means. The modular approach provides an economic advantage in that less sensing clamp sections are required, which are typically much more expensive to produce and maintain than simple clamping devices.

DETAILED DESCRIPTION OF THE DRAWINGS

A method for aligning an optoelectronic device with an optical MT connector is disclosed. The optoelectronic device may comprise edge emitting lasers, surface emitting lasers, or other light emitting diodes known to those skilled in the art. In a first embodiment, the optoelectronic device is a vertical cavity surface emitting laser (VCSEL).

The method involves an alignment tool as disclosed which provides precise coupling between of the VCSEL and the MT connector through a multiple element clamping system. In addition, the tool contains a test component for determining operability of the VCSELs prior to application of adhesive and before installation into an optical network package such as a transceiver unit. Once proper alignment is achieved, adhesive is applied between the optoelectronic device and the fiber connector and alignment is tested again. The test component is then removed and the VCSEL clamp unit, with the aligned VCSEL and MT connector, is placed in an oven for adhesive curing.

Figure 1:
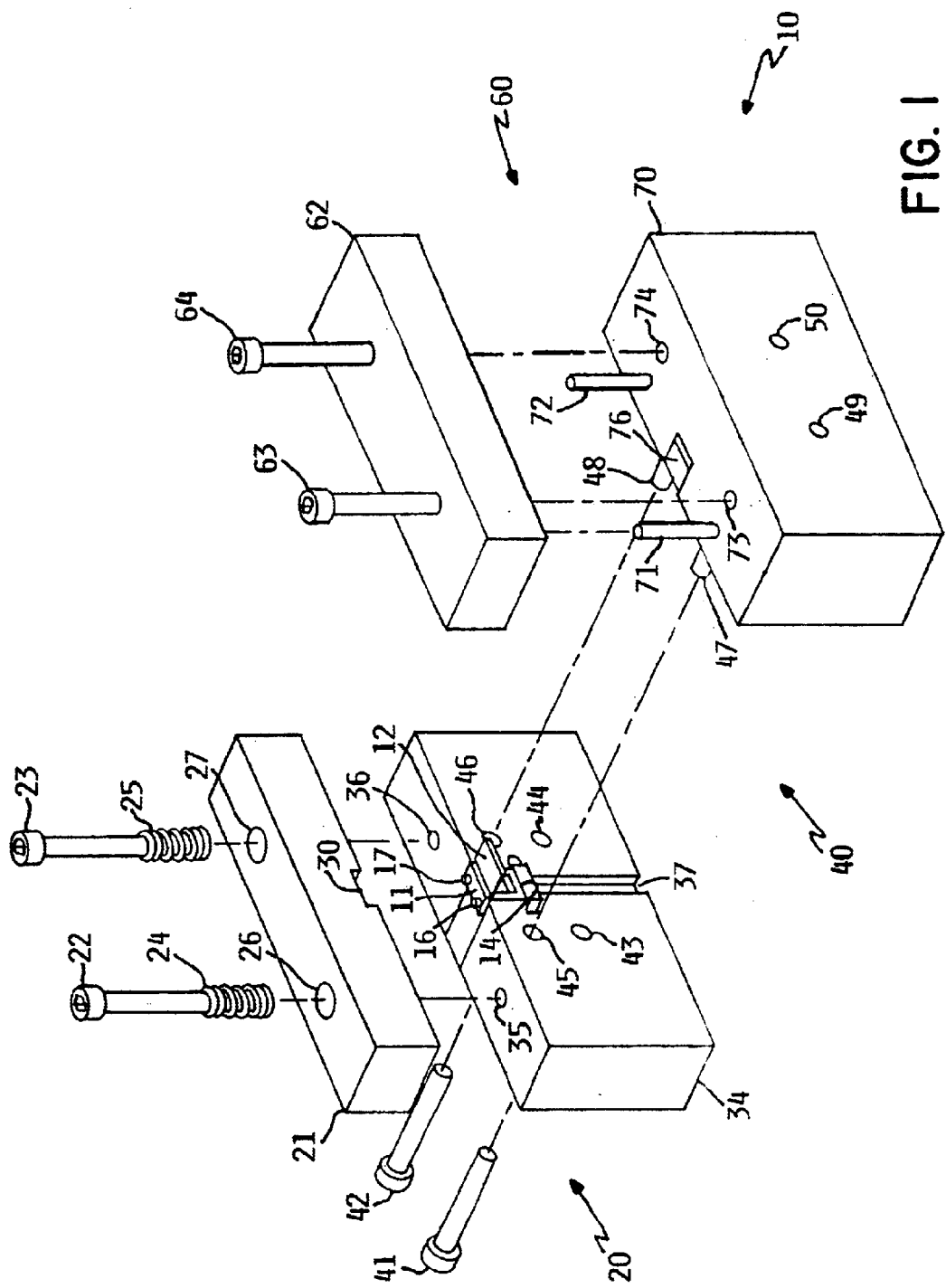
FIG. 1 is an exploded perspective view of the present invention in which a VCSEL is mounted on the MT optical connector and the flexible circuit extends toward the testing clamp unit.

A VCSEL alignment tool 10 in accordance with the present invention is constructed as shown in FIGS. 1–8. FIG. 1 is an exploded perspective view of a VCSEL alignment tool 10 which provides for passive optical fiber alignment with an optoelectronic device through a multi-piece clamp system which incorporates mechanisms for activating the laser array prior to installation in an optical package. The VCSEL alignment tool 10 is comprised of four separate blocks, three of which are preferably machined from aluminum or another metal suitable for said bonding and alignment. The fourth block is comprised of a dielectric material suitable for housing the laser activation mechanism. The multi-piece clamp system is designed to immobilize the VCSEL 11, the VCSEL flexible circuit 12, the electrical spacer block 13 and the MT connector 14. The three clamping elements are the VCSEL block 20, the MT optical connector block 40 and the test block 60.

Figure 4:
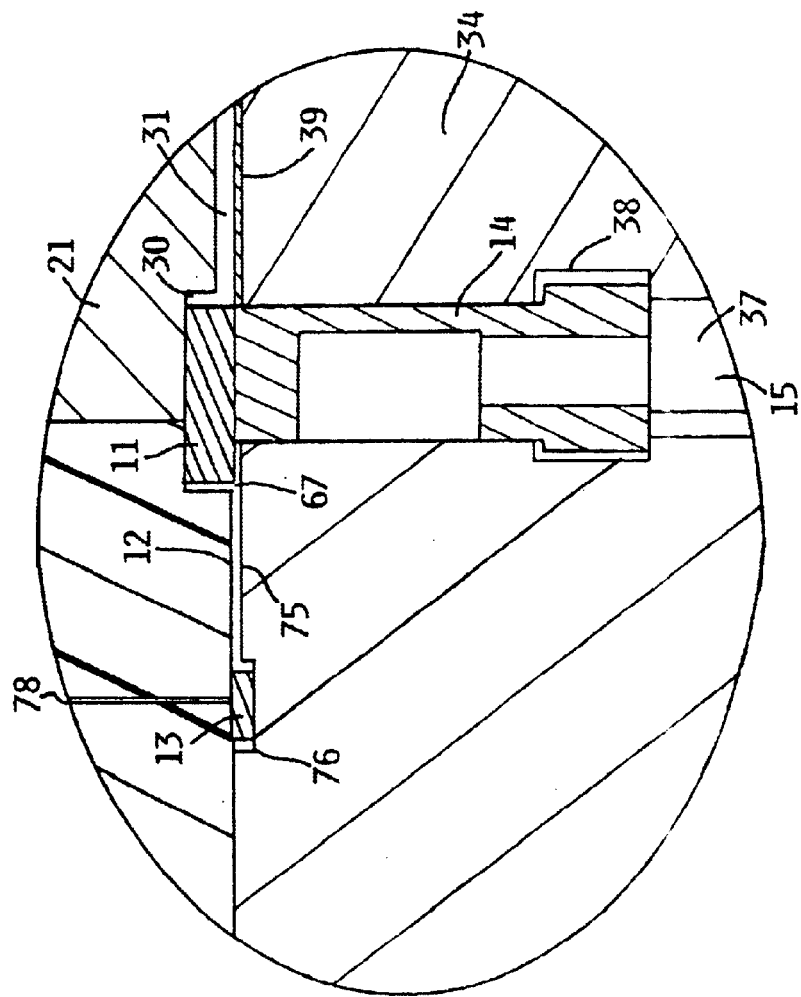
FIG. 4 is fragmented vertical section view on an enlarged scale of the VCSEL, flexible circuit package and MT connector.

The VCSEL 11 is electrically connected to an optical package 80 by flexible circuit 12. Flexible circuit 12 contains electrical traces which carry the electrical signals from activation pads 77 (see FIG. 6) to VCSEL 1, where the electrical signals are converted to laser pulses. The flexible circuit 12 is disposed on the active face of VCSEL 11 at one end and the opposing end is disposed on electrical spacer block 13 (FIG. 4).

The VCSEL block 20 is comprised of a VCSEL clamp 21 and a VCSEL base 34. VCSEL clamp screws 22 and 23 are inserted through holes 26 and 27 of VCSEL clamp 21. Holes 26 and 27 are vertically aligned with threaded holes 35 and 36 of the VCSEL clamp base 34. VCSEL screws 22 and 23 are inserted axially through compression springs 24 and 25 prior to engaging the VCSEL clamp base 34. Compression springs 24 and 25 extend only partially into VCSEL clamp 21. Preferably, the spring tension is set so that the VCSEL clamp 21 restrains the VCSEL 11 without damage to the lasers within, and is typically set at a force of 4 lbs per the industry standard. The proximal face of VCSEL clamp 21 engages the back or inactive face of VCSEL 1. In a first embodiment, springs 24 and 25 are set to 4 lbs of force so as not to damage the VCSEL 11 and provide recommended interface pressure between the VCSEL 11 and MT 14.

When assembled, VCSEL block 20 holds the VCSEL 11 and MT connector 14 in alignment for testing. The VCSEL 11 sits on top of the MT connector 14 utilizing alignment pins 16 and 17 inserted axially through VCSEL 11 into MT connector 14. The upper surface of VCSEL 11 is disposed within VCSEL cavity 30 of VCSEL clamp 21.

MT block 40 mates VCSEL clamp base 34 to test clamp base 62 (FIG. 3) through the horizontal insertion of alignment screws 41 and 42 and guide pins 47 and 48. Screws 41 and 42 are inserted through holes 45 and 46 of VCSEL clamp base 34 and threaded into holes 49 and 50 of test clamp base 62. Alignment is enhanced by guide pins 47 and 48, which extend perpendicular to the mating face of test clamp base 62, which engage guide pin holes 45 and 46 on VCSEL clamp base 34.

Test block 60 clamps the flexible circuit 12 and electrical spacer block 13 between test block base 70 and test clamp 62. Test clamp 62 is aligned with test block base 70 through pins 71 and 72 which extend axially into guide pin holes 65 and 66. Alignment is maintained by way of screws 63 and 64 which extend into threaded base holes 73 and 74.

Test clamp 62, made of a dielectric material, contains a plurality of pogo pins 78 which carry the current required to activate the VCSEL 11. (See FIG. 6). Pogo pins 78 are well known to those skilled in the art for providing a spring loaded probe surface. Advancing test clamp 62 on to test block 60 results in contact between pogo pins 78 and activation pads 77. Depression of spring loaded pogo pin 78 forces the opposing end to extend distally thus completing the circuit to the test leads (not shown) for activating VCSEL 11.

Figure 2:
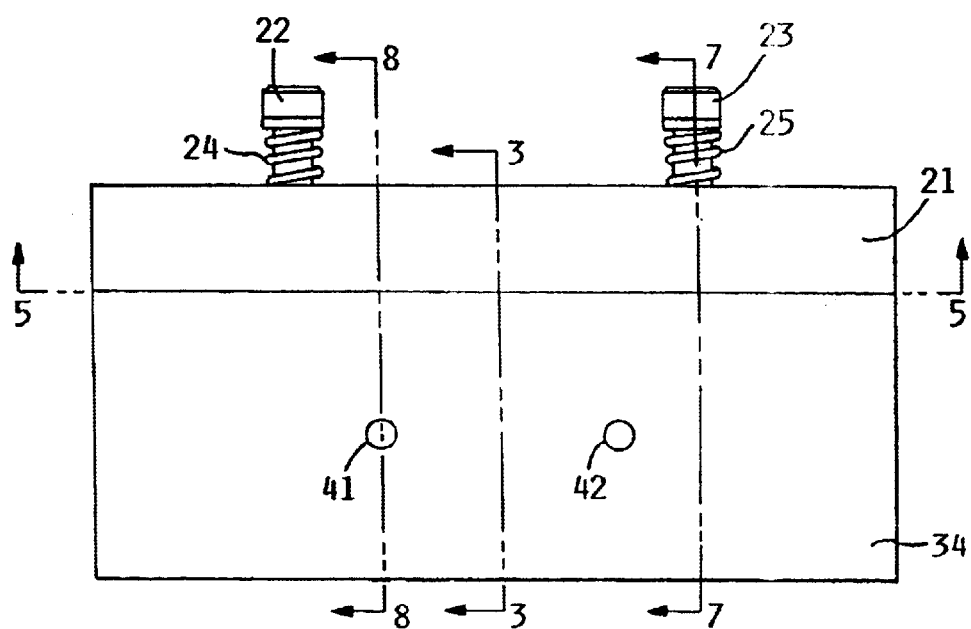
FIG. 2 is an end view of the VCSEL clamp section of the present invention showing the screws fully engaged.
Figure 3:
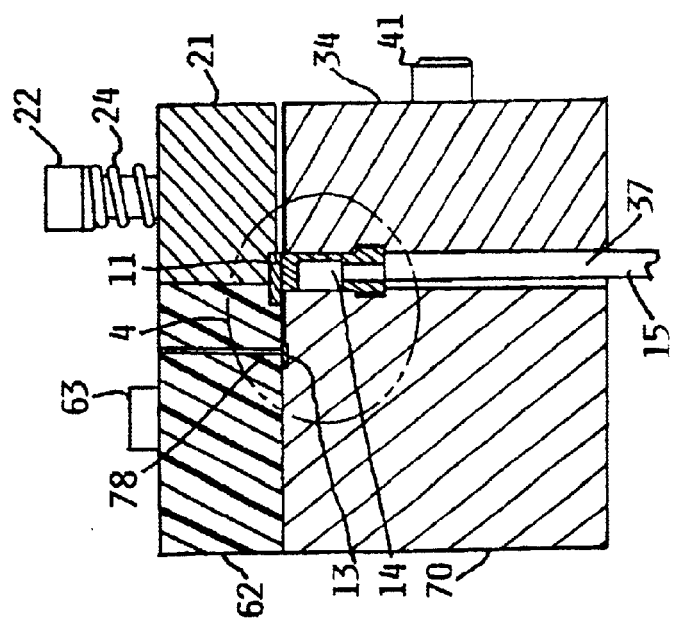
FIG. 3 is a vertical section taken generally along line 3—3 of FIG. 2 of the present invention.

Referring to FIG. 3, which is a cross-sectional view taken from line 3—3 of FIG. 2, the intersection of the three clamping units with the VCSEL 11, MT connector 14 and electrical spacer block 13 installed are shown in greater detail. Channel 37 forms a cavity in VCSEL clamp base 34 for the travel of optical fiber 15 that terminates at optical connector 14. The distal end of fiber 15 is connected to a test apparatus (not shown) for measuring optical output from the connection.

An enlarged view of the point of intersection is contained in FIG. 4 as referenced in FIG. 3. When screws 22 and 23 are properly torqued, 4 lbs of force is applied between the VCSEL 11 and MT connector 14. The VCSEL clamp 21 and VCSEL clamp base 34 remain separated by the VCSEL 11. On the proximal end, VCSEL clamp 21 is in contact with the back face of VCSEL 11 while channel 31, which is slightly wider than the width of VCSEL 11 extends to the distal end. A shallower channel 39 of comparable width mirrors channel 31 on the VCSEL clamp base 34. This ensures force is placed effectively between the VCSEL 11 and MT connector 14.

Figure 6:
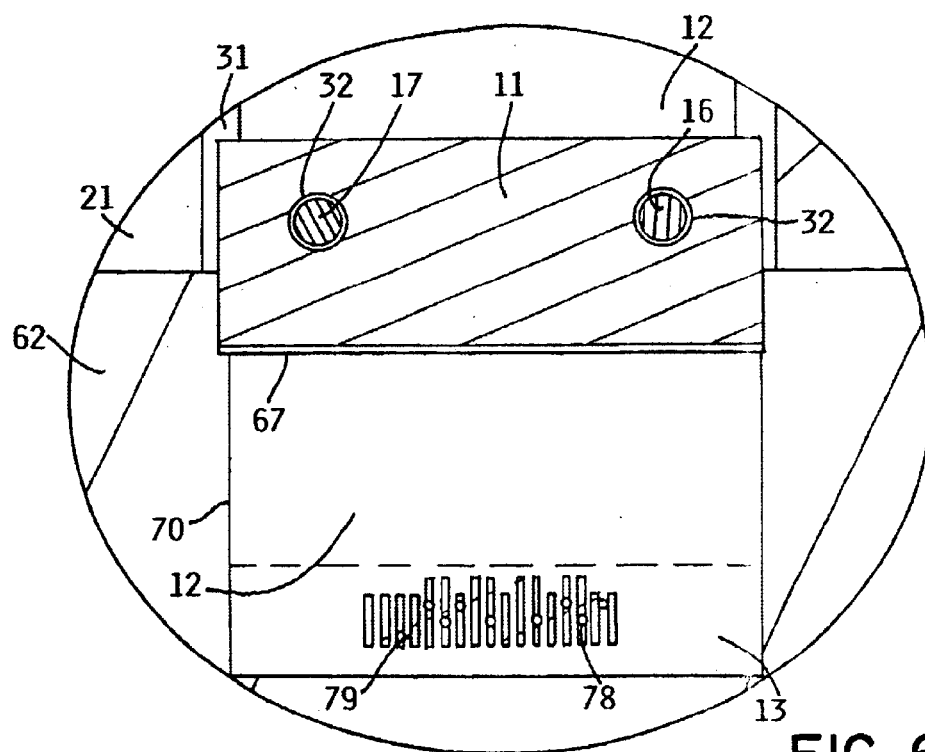
FIG. 6 is a fragmented horizontal sectional view of the present invention on an enlarged scale of the VSCEL and testing pad.

Referring to FIG. 4, VCSEL cavity 30, is disposed within the VCSEL mating face of VCSEL clamp 21. Prior to application of the adhesive, pins 16 and 17 may extend axially above the back face of VCSEL 11. To provide additional clearance, VCSEL cavity 30 contains pin cavity voids 32 extending distally from VCSEL 11. As illustrated in FIG. 6, pin cavity voids 32 have a diameter slightly larger than that of pins 16 and 17. FIG. 4 also illustrates that channel 31 and test clamp VCSEL cavity 67 are sized so as to provide clearance for egress of the adhesive from the VCSEL 11 and MT connector 14 interface at the point of application when pressure is applied, and during the cure stage.

Figure 5:
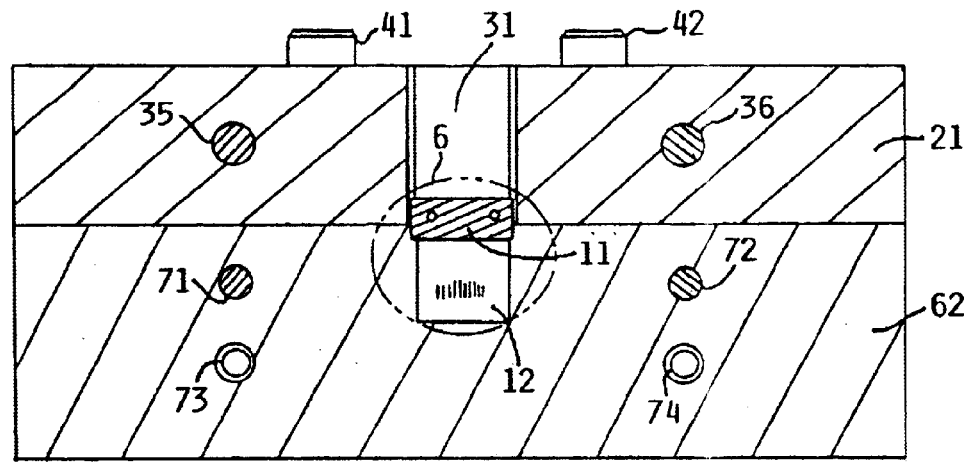
FIG. 5 is a horizontal sectional view of the present invention taken generally along line 5—5 of FIG. 2.

FIG. 5 is a cross-sectional view taken at line 5—5 from FIG. 2, illustrating the proximal surface of VCSEL clamp 21 and test clamp 62. VCSEL channel 31 is centrally located on the proximal face of VCSEL clamp 21. Laser activation pogo pins 78 disposed in recesses contained within test clamp 62 extend axially onto the activation pad array 77 disposed at the distal end of flexible circuit 12.

FIG. 6 is an enlarged view of the VCSEL 11 from FIG. 5. Alignment pins 16 and 17 are axially extending through VCSEL 11 into MT connector 14 (not shown). Activation pads 77 are disposed on flexible circuit 12 which rests on electrical spacer block 13. Pogo pins 78 are set into recesses within Test clamp 62, the tips of which extend beyond the base of the clamp 62 to activate optical circuits within the VCSEL 11.

Figure 7:
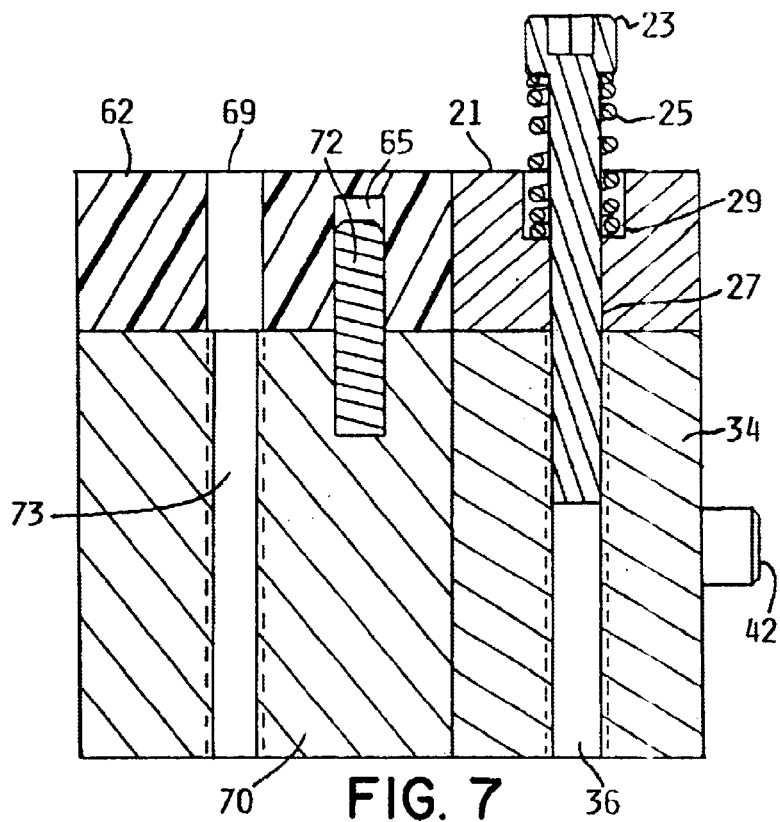
FIG. 7 is a vertical section view of the present invention taken generally along line 7—7 of FIG. 2.

FIG. 7 is a cross-sectional view taken at line 7—7 from FIG. 2 illustrating the vertical alignment elements. Test block screw 73, test base guide pin 72 and VCSEL block screw 23 provide alignment means when assembly has reached the activation and sensing mode. FIG. 7 illustrates the seat 29 for compression spring 25 axially disposed about screw 23.

Figure 8:
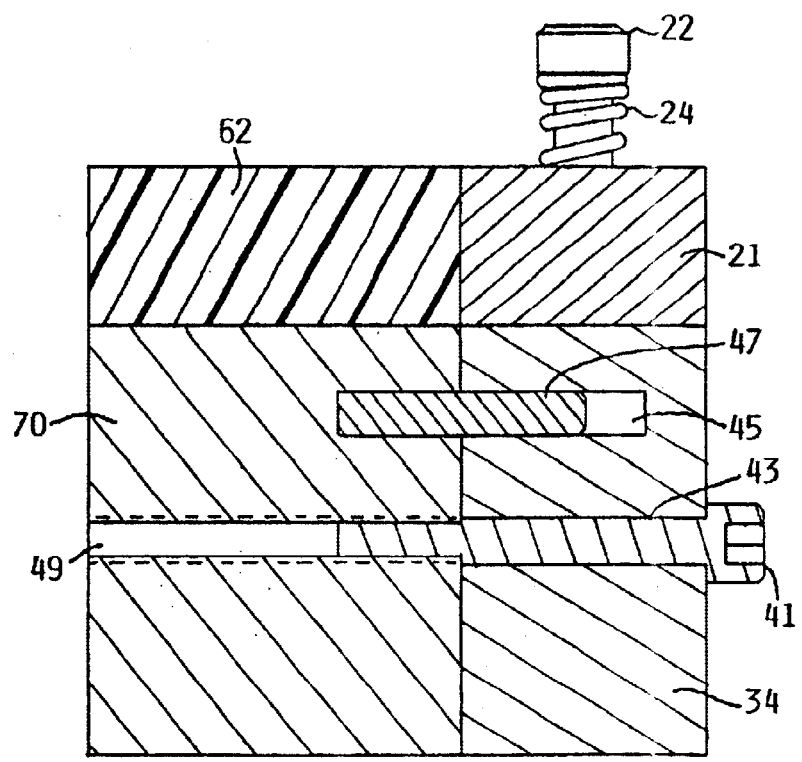
FIG. 8 is a vertical section view of the present invention taken generally along line 8—8 of FIG. 2.

FIG. 8 is a cross-sectional view taken at line 8—8 from FIG. 2 illustrating the horizontal alignment elements: (MT guide pin 47 and MT screw 41) when assembly has reached the activation and sensing mode. During the curing stage of assembly, test clamp 62 and test block base 70 are removed.

Figure 9:
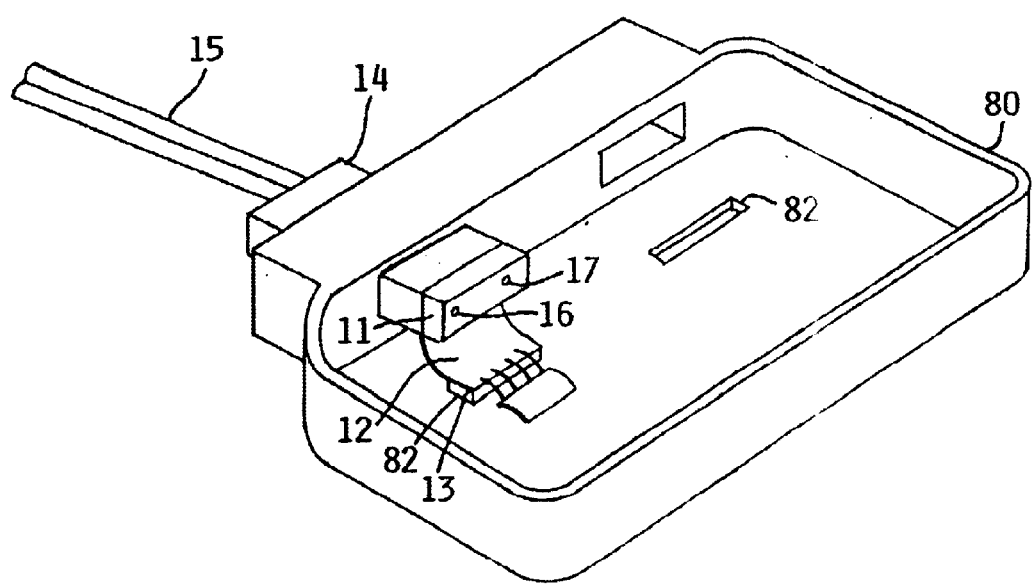
FIG. 9 is a perspective view of a transceiver package with a completed MT optical connector attached to a VCSEL unit.

FIG. 9 illustrates how the completed VCSEL unit with one MT connector 14 in proper alignment is attached to a transceiver package 80. Electrical spacer block 13 fits within recess 82 of package 80 so that flexible circuit 12 is properly aligned. The present method eliminates the prior method of testing alignment only after the VCSEL was installed permanently in the transceiver.

In operation, the tool assembly is used as follows. MT cable 15 with MT connector 14 attached are inserted into MT cable cavity 37 and MT connector cavity 38 respectively. VCSEL assembly 11 with flexible circuit 12 and electrical spacer block 13 already installed are disposed on top of MT connector 14. Alignment pins 16 and 17 are axially advanced through VCSEL 11 and through MT connector 14. MT clamp 40 is now engaged by advancing screws 41 and 42 through their respective holes 43 and 44 while guide pins 47 and 48 are inserted into guide holes 45 and 46. The MT connector 14 with VCSEL 11 attached is now locked in place with appropriate interface pressure. Electrical spacer block 13 rests within detector cavity 76 mounted on the upper face of the test block base 70. Note that at this point the VCSEL is not attached to the MT connector, the only means of restraint being pins 16 and 17.

VCSEL block 20 is now clamped down by advancing screws 22 and 23 into holes 35 and 36 within VCSEL clamp base 34. Screws are tightened down to 4 lbs of force pursuant to the recommendations of the designers with springs 24 and 25. VCSEL clamp 21 pushes against the center of blind face of VCSEL 11 in order to distribute the force and result in the appropriate interface between VCSEL 11 and MT connector 14.

Alignment and testing of VCSEL 11 is performed by engaging the test clamp block 60. Screws 63 and 64 are advanced into holes 73 and 74 coincident with guide pins 71 and 72 advancing upward into guide pin holes 65 and 66 within test clamp 62. The clamping force places the activation pads 77 in contact with pogo pins 78 which in turn completes the electrical circuit to trigger the respective optical lines in VCSEL 11. Signal strength and clarity are monitored by way of MT cable 15. If the system meets performance standards, the VCSEL clamp 21 is removed by retreating screws 22 and 23. VCSEL unit 11 is lifted off of MT connector 14 and an adhesive is applied. VCSEL 11 is then returned upon alignment pins 16 and 17. Screws 22 and 23 are advanced once again into the unit into VCSEL clamp base 34. A final test is performed and the VCSEL alignment and performance is measured. If operation is still within performance parameters, test clamp 60 is released by retreating screws 63 and 64. In addition, MT clamp 40 is opened by retreating screws 41 and 42. VCSEL block 20 with MT connector 14 adhered properly to VCSEL 11 is placed in an oven for curing. Test block 60 can now be used to perform diagnostics and alignment tests on another VCSEL/MT connection.

It is to be understood that the embodiments described herein are only illustrative and modifications of the various dimensions and materials can be made still within the spirit and scope of this invention.

What is claimed is:

1. An external alignment system tool for coupling an optoelectronic device to an optical fiber connector and testing the alignment of the coupled optoelectronic device and optical fiber connector prior to installation into a device package, wherein the optoelectronic device includes a plurality of vertical cavity surface emitting lasers (VCSEL) mounted in a linear array disposed within a support body which contains a plurality of alignment holes, the external alignment system tool comprising:

an optical fiber connector clamp comprising a test section and an optical device section;

an optical device clamp, said optical device clamp advanced upon said optical device section of the optical fiber connector clamp; and a test clamp, said test clamp advanced upon said test section of the optical fiber connector clamp.

2. The tool of claim 1 wherein a flexible circuit is electrically connected to the VCSEL at one end and containing an array of laser activation pads at an opposing end.

3. The tool of claim 2 wherein an electrical spacer block is disposed under the array of laser activation pads of the flexible circuit.

4. The tool of claim 1 wherein the optical fiber connector contains a proximal face to which the optoelectronic device is attached and a distal face to which an optical fiber cable is attached.

5. The tool of claim 4 wherein the optical fiber connector further includes a plurality of alignment holes, said holes forming a cylindrically shaped recess.

6. The tool of claim 1 wherein the mating of the test section and optical device section of the optical fiber connector clamp at an interface plane forms an optical connector cavity for aligning the position of the optical fiber connector, a mouth of said cavity disposed at a device end of the interface plane and a cable channel extending from the cavity the length of the interface plane.

7. The tool of claim 6 wherein the optical fiber connector with an attached optical cable are contained within the optical connector cavity and cable channel respectively.

8. The tool of claim 1 wherein the mating of the optical device clamp and the optical device section of the optical fiber connector clamp is restricted by a compression spring disposed around an optical device clamp screw.

9. The tool of claim 8 wherein the optoelectronic device is disposed on the optical connector, said optoelectronic device extending into a cavity created by the positioning of the optical device clamp on the optical device section of the optical fiber connector clamp.

10. The tool of claim 9 wherein a back face of the optoelectronic device is in contact with a mating face of the optical device clamp.

11. The tool of claim 2 wherein the mating of the test clamp to the test section of the optical fiber connector clamp creates an electrical spacer block cavity for the electrical spacer block and the flexible circuit.

12. The tool of claim 11 wherein the test clamp contains a plurality of pogo pins aligned in a predetermined pattern extending into the electrical spacer block cavity, said clamping action placing the pogo pin in contact with an array of laser activation pads within the flexible circuit, excitation of which then activates the optical device.

13. The tool of claim 1 wherein the test clamp and the test section of the optical fiber connector clamp are removed during the curing of an adhesive placed between the optical connector and the optoelectronic device.

14. A method of positioning an optoelectronic device onto an optical fiber connector and maintaining that position while testing the alignment of said optoelectronic device with the optical fiber connector prior to installation within a transceiver package, the optoelectronic device comprised of an optical device, a flexible circuit with an array of laser activation pads and an electrical spacer block, said method comprising the steps of:

a) clamping the optical fiber connector into a cavity within an optical fiber connector clamp, whereby an interface surface of the optical fiber connector is flush with a proximal face of said optical fiber connector clamp, said optical fiber connector clamp being comprised of a device section and a test section;

b) aligning an active face of the optoelectronic device with the interface surface of the optical fiber connector;

c) clamping the optoelectronic device to the optical fiber connector by advancing an optoelectronic device clamp onto the device section of the optical fiber connector clamp;

d) clamping the electrical spacer block and flexible circuit by advancing a test clamp onto the test section of the optical fiber connector clamp;

e) testing the relative positioning of the optoelectronic device to the optical fiber connector by activating the optoelectronic device and measuring the output;

f) removing the optoelectronic device clamp;

g) applying adhesive to the interface surface of the optical fiber connector after removing the optoelectronic device;

h) repeating steps b–e;

i) removing the test clamp and the test section of the optical fiber connector clamp; and j) curing said adhesive.

15. The method of claim 14 wherein the optoelectronic device is a VCSEL.

16. The method of claim 14 wherein alignment of the optoelectronic device to the optical connector is by matching a plurality of alignment holes in the optical connector with a plurality of alignment holes in the optoelectronic device and inserting an alignment pin through the respective alignment holes.

17. The method of claim 16 wherein the alignment pins float within the respective alignment holes.

18. The method of claim 14 wherein the clamping of the optoelectronic device to the optical fiber connector is controlled by a compression spring disposed on a clamping screw.

19. The method of claim 18 wherein the clamping force is set at 4 lbs.

20. The method of claim 14 wherein testing of the alignment of the optoelectronic device to the optical connector occurs by exciting the optoelectronic devices through a plurality of pogo pins disposed within an active face of the test clamp and aligned in a predetermined pattern, said clamping action placing the pogo pin in contact with an array of activation pads within the flexible circuit which then activates the optical device.

21. The method of claim 14 wherein a mating face of the optoelectronic clamp includes a plurality of cavities to allow for the vertical movement of the floating alignment pins.

22. The method of claim 14 wherein the optical fiber connector clamp includes an optical fiber channel formed by the mating of the test section and the device section, said channel providing access to the optical connector for an optical fiber cable.

23. An optoelectronic assembly tool adaptable for mating an optoelectronic device with an optical connector, said optoelectronic device including a flexible electrical conduit which provides electrical communication from an activation pad array disposed at the distal end of the flexible conduit, and said optical connector including an optical cable comprised of a plurality of optical fibers, a first end of which is attached to the optical connector, the opposing ends of which is attached to a test device, said tool comprising:

means for restraining the optical connector and optical cable;

means for aligning an output array of the optoelectronic device and an input array of the optical connector;

means for maintaining the relative position of the optoelectronic device and optical connector after alignment while providing appropriate interface pressure;

means for restraining the flexible circuit; and means for testing alignment and performance of the optoelectronic device prior to applying an adhesive to the an interface of the optoelectronic device and the optical connector and after applying said adhesive.

24. The assembly tool of claim 23 in which the optoelectronic device is a vertical cavity surface emitting laser (VCSEL).

25. The assembly tool of claim 23 wherein the means to restrain the optical connector and optical cable includes an optical fiber connector clamp comprised of a device section and a test section, the mating of the two sections forming a recess sized to contain the optical connector and optical cable.

26. The assembly tool of claim 25 wherein the means for aligning the output array of the optoelectronic device and an input array of the optical connector includes a plurality of floating alignment pins axially inserted into a cylindrical recess created by matching an alignment hole on the optoelectronic device with an alignment hole on the optical connector.

27. The assembly tool of claim 26 wherein the means for aligning the output array of the optoelectronic device and an input array of the optical connector further includes disposing the optical connector and optoelectronic device in an alignment cavity created by mating an optoelectronic device clamp onto the device section of the optical connector clamp.

28. The assembly tool of claim 27 wherein the mating of the optoelectronic clamp is preloaded by a compression spring disposed on a clamping screw so that the optoelectronic device is not damaged during the alignment process and an interface pressure is maintained.

29. The assembly tool of claim 25 wherein the means for restraining the flexible circuit includes disposing the flexible circuit and an electrical spacer block within a test cavity created by mating a test clamp onto the test section of the optical connector clamp.

30. The assembly tool of claim 29 wherein the means for testing alignment and performance of the optoelectronic device includes a plurality of pogo pins aligned in a predetermined pattern extending from the test clamp, said clamping action placing the pogo pin in contact with the activation pad, excitation of which then activates the optical device.

* * * * *